(12) United States Patent
Hwang

(10) Patent No.: US 7,293,815 B2
(45) Date of Patent: Nov. 13, 2007

(54) GUIDE STRUCTURE OF A TRAY

(75) Inventor: Sung-Won Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 3 days.

(21) Appl. No.: 11/197,402

(22) Filed: Aug. 5, 2005

(65) Prior Publication Data
US 2006/0038422 A1    Feb. 23, 2006

(30) Foreign Application Priority Data
Aug. 17, 2004    (KR) .................. 10-2004-0064755

(51) Int. Cl.
*B60N 3/12* (2006.01)
(52) U.S. Cl. .................. 296/37.12; 296/37.8; 296/37.1
(58) Field of Classification Search .............. 296/37.1, 296/37.12, 37.6, 37.8, 37.9, 24.34; 224/281; 312/330.1, 334.1
See application file for complete search history.

(56) References Cited

U.S. PATENT DOCUMENTS

| | | | | | |
|---|---|---|---|---|---|
| 2,793,092 | A | * | 5/1957 | Peterson | 312/246 |
| 3,321,253 | A | * | 5/1967 | Everburg | 384/23 |
| 3,453,034 | A | * | 7/1969 | Boer | 312/216 |
| 3,460,876 | A | * | 8/1969 | Boer | 312/246 |
| 5,002,074 | A | * | 3/1991 | Kimisawa | 131/231 |
| 5,088,636 | A | * | 2/1992 | Barajas | 224/281 |
| 5,393,137 | A | * | 2/1995 | Bivens et al. | 312/332 |
| 6,264,083 | B1 | * | 7/2001 | Pavlick et al. | 224/404 |
| 6,464,277 | B2 | * | 10/2002 | Wilding | 296/37.6 |
| 6,598,925 | B2 | * | 7/2003 | Sawatani et al. | 296/37.1 |
| 6,709,041 | B1 | * | 3/2004 | Hotary et al. | 296/70 |
| 6,877,829 | B2 | * | 4/2005 | Irizarry | 312/291 |
| 2006/0102669 | A1 | * | 5/2006 | Fouts et al. | 224/404 |

FOREIGN PATENT DOCUMENTS

JP    2004-033267    2/2004

OTHER PUBLICATIONS

English Language Abstract of JP 2004-033267.
U.S. Appl. No. 11/109,796 to Kim, filed Apr. 20, 2005.

* cited by examiner

*Primary Examiner*—Dennis H. Pedder
*Assistant Examiner*—Mike Hernandez
(74) *Attorney, Agent, or Firm*—Greenblum & Bernstein, P.L.C.

(57) ABSTRACT

A guide structure of a tray includes a guide part equipped to a predetermined location within a vehicle and having a pair of upper and lower guide rails protruded on either inner side of the guide part while being spaced a predetermined distance apart from each other, a receiving box inserted into the guide part, and a plurality of guide members, each of which is provided to either side of the receiving box and inserted between the upper and lower guide rails at either inner side surface of the guide part.

4 Claims, 3 Drawing Sheets

GUIDE STRUCTURE OF A TRAY

RELATED APPLICATIONS

The present disclosure relates to subject matter contained in Korean Application No. 10-2004-64755, filed on Aug. 17, 2004, which is herein expressly incorporated by reference its entirety.

BACKGROUND OF THE INVENTION

1. Field of the Invention

The present invention relates to a guide structure of a tray, and, more particularly, to a guide structure of a tray, which comprises a guide part, a receiving box slided into the guide part, and guide members mounted on the receipt box, wherein each of the guide members has supporting pieces formed on one side of the guide member to compress the inner side surface of the guide part so as to minimize the clearance created between the guide part and the receiving box, thereby preventing the receiving box from rattling upon sliding within the guide part.

2. Description of the Related Art

Generally, a vehicle has a tray equipped to a lower portion of an instrument panel in order to enhance driver and passenger convenience. The tray of the vehicle provides a receiving space for receiving small articles, such as glasses and the like, within the interior of the vehicle, and is equipped at a proper location to the instrument panel within the interior of the vehicle.

The tray of the vehicle typically comprises a housing having a receiving space of a predetermined size defined therein, a receiving box inserted into an open portion of the housing and sliding along the housing, and a locking means for the receipt box.

FIG. 1 is a schematic exploded perspective view illustrating a conventional tray, and FIG. 2 is a cross-sectional view illustrating the conventional tray of FIG. 1.

Referring to FIGS. 1 and 2, a housing 11 is provided to an instrument panel of a vehicle at a proper location for receiving a tray, and has an opening formed at a front side thereof.

The conventional tray comprises a receipt box 12, which is slided into the opening of the housing 11, and a pair of guide rails 13 provided to the housing 11 such that the receiving box 12 can smoothly slide within the housing 11.

Each of the guide rails 13 is mounted on a side surface of the housing 11, so that the receiving box 12 can move along the guide rails 13 within the housing 11.

Each of the guide rails 13 has a rim 15 protruded on an inner surface thereof, and the receiving box 12 has a groove 16 formed at either outer side surface of the receiving box 12 so as to allow the rim to be inserted into the groove 16, so that the receiving box 12 can smoothly move along the guide rails 13 within the housing 11.

Here, the rim 15 can be formed on either outer side surface of the receiving box 12, and the groove 16 can be formed on the inner surface of each guide rail 13.

However, with the construction described above, in order to assure that the receipt box can move smoothly along the guide rails within the housing, a predetermined clearance must be created between the guide rails and the receiving box, more specifically, between the rims and the grooves, causing the problem of rattling and noise upon sliding of the receiving box along the guide rails within the housing.

SUMMARY OF THE INVENTION

The present invention has been made to solve the above problems, and it is an object of the present invention to provide a guide structure of a tray, which has separate guide members between guide rails and a receiving box so as to reduce the clearance between the guide rails and the receiving box, thereby preventing rattling and noise upon sliding of the receiving box along the guide rails within a housing.

In accordance with an aspect of the present invention, the above and other objects can be accomplished by the provision of a guide structure of a tray, comprising: a guide part equipped to a predetermined location within a vehicle and having a pair of upper and lower guide rails protruded on either inner side of the guide part while being spaced a predetermined distance apart from each other; a receiving box inserted into the guide part; and guide members, each of which is provided to either side of the receiving box and inserted between the upper and lower guide rails at either inner side surface of the guide part.

In the guide structure of the tray, the guide members of the receiving box are engaged with the guide rails of the guide part to ensure smooth sliding of the receiving box, and a side surface of each guide member compresses the inner side surface of the guide part to reduce the clearance created between the guide part and the receiving box, thereby minimizing the rattling and noise upon sliding of the receiving box within the guide part.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Preferred embodiments will now be described in detail with reference to the accompanying drawings.

It should be noted that the embodiment of the present invention does not limit the scope of the invention, but is described as an example, and thus that various embodiments can be realized according to the spirit of the present invention.

Figure 1:
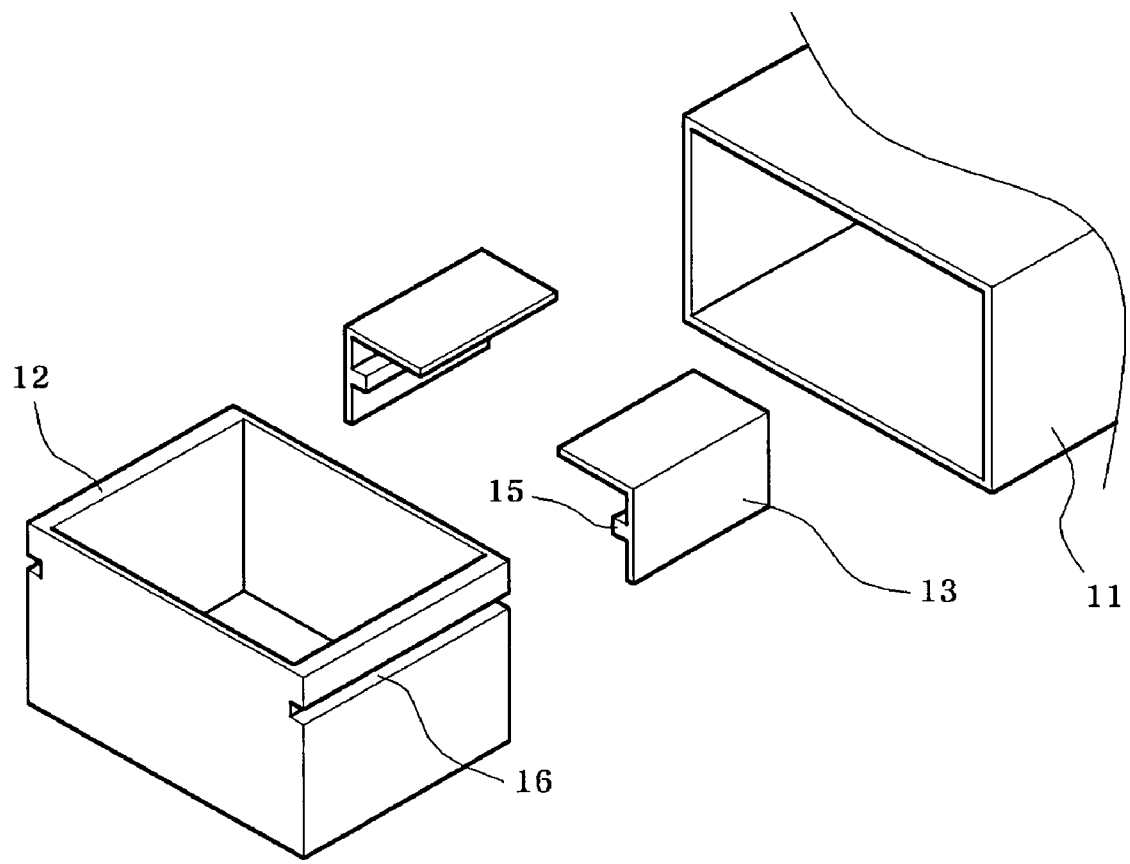
FIG. 1 is a schematic exploded perspective view illustrating a conventional tray.
Figure 2:
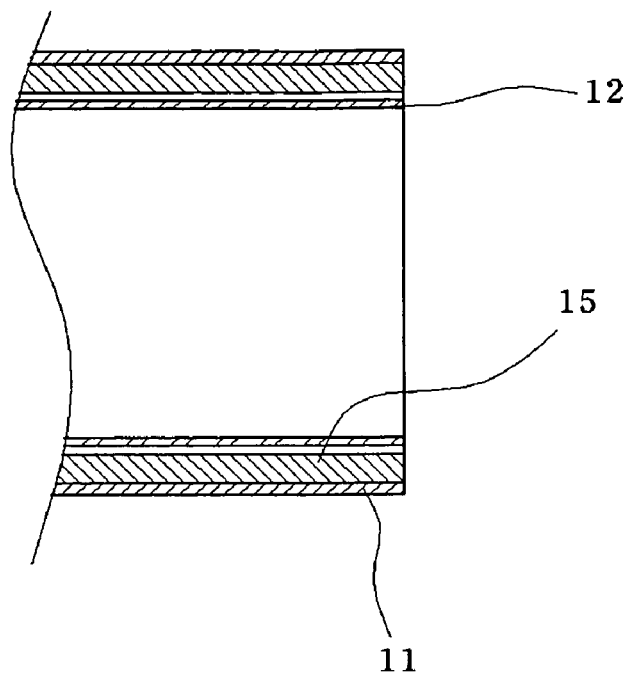
FIG. 2 is a cross-sectional view illustrating the conventional tray of FIG. 1.
Figure 3:
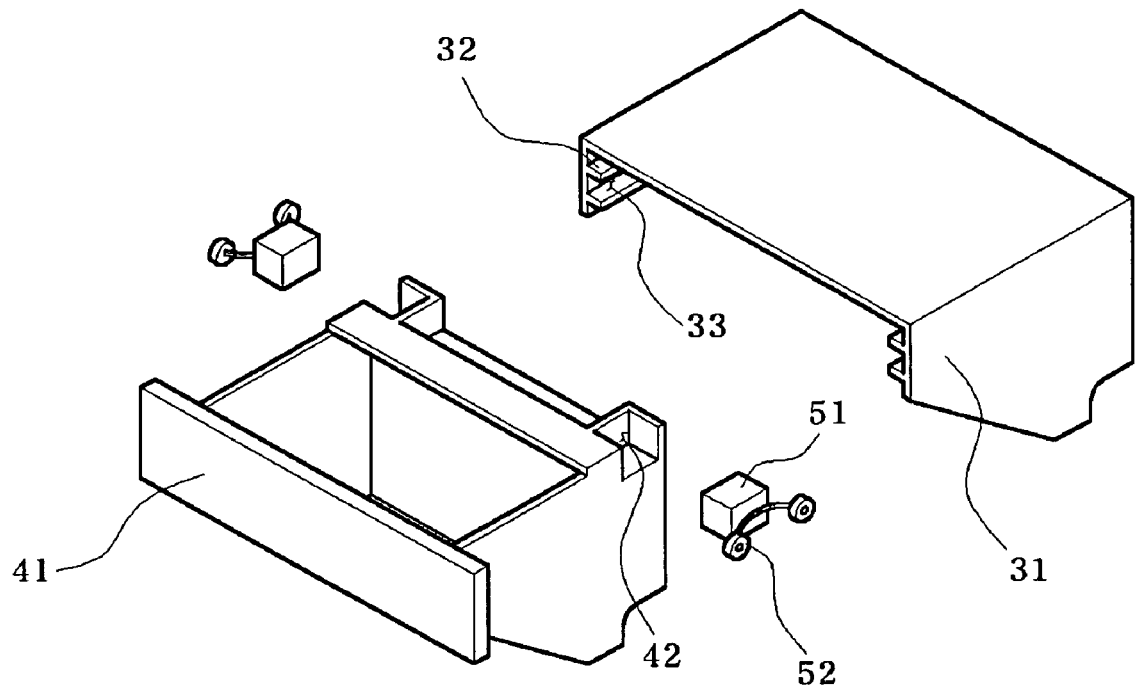
FIG. 3 is an exploded perspective view illustrating a tray in accordance with the present invention.
Figure 4:
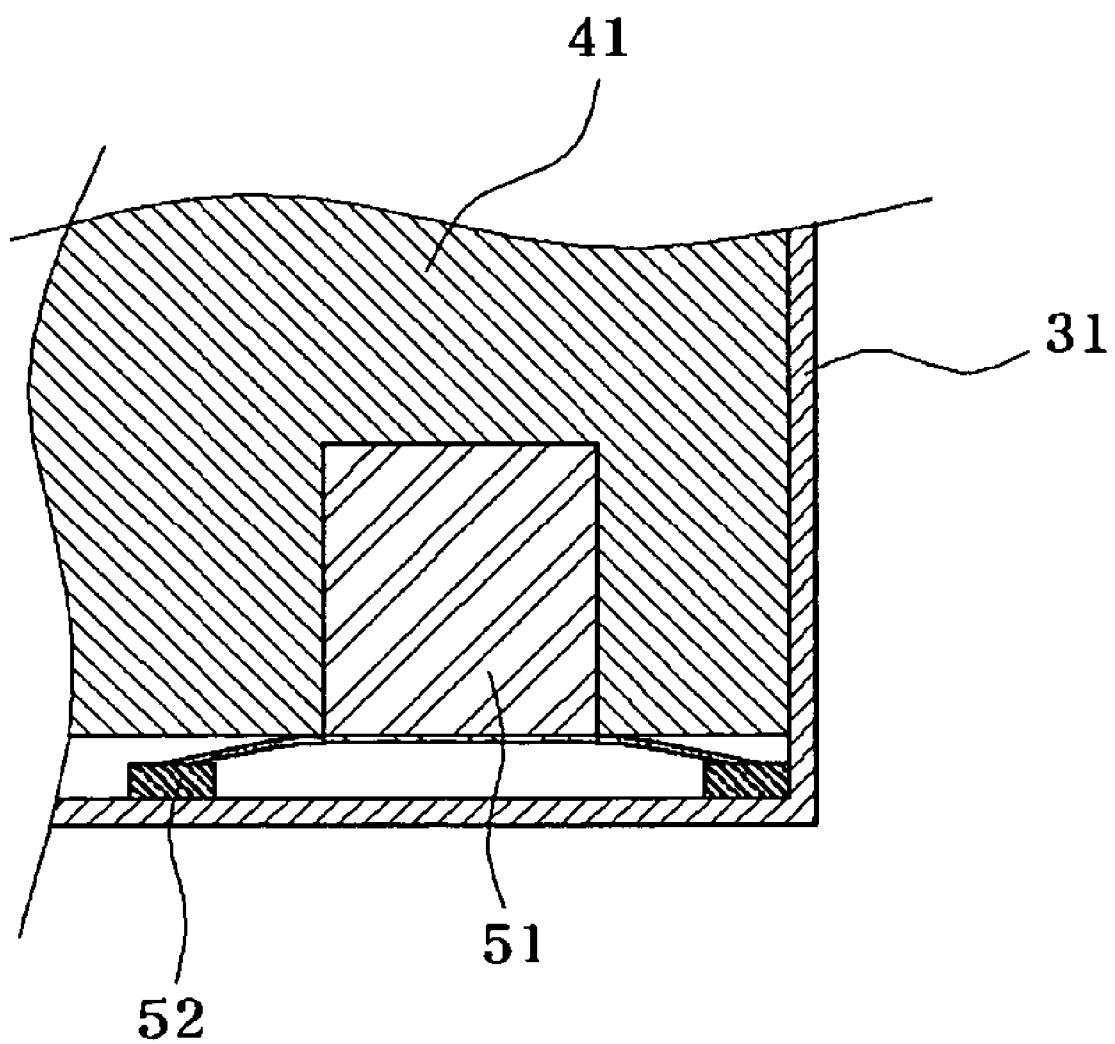
FIG. 4 is a cross-sectional view illustrating the tray of FIG. 3.

FIG. 3 is an exploded perspective view of a tray in accordance with the present invention, and FIG. 4 is a cross-sectional view of the tray of FIG. 3.

Referring to FIGS. 3 and 4, the tray of the present invention comprises a guide part 31 equipped at a predetermined location to an instrument panel of a vehicle. The guide part 31 may be equipped to a housing (now shown) opened at a front side, and alternately, it may be directly equipped to a space defined at a predetermined location of the vehicle.

The guide part 31 has a pair of upper and lower guide rails 32 protruded on either inner side surface of the guide part 31 while being spaced a predetermined distance from each other.

Here, reference numeral 33 denotes a guide recess, which is defined between the upper and lower guide rails 32.

The tray comprises a receiving box 41, which is inserted into the guide part 31, and which has a receiving space formed therein to receive various small articles.

The tray also comprises guide members 51 at both sides of the receiving box 41. Each of the guide members 51 is fitted to the guide recess 33 between the upper and lower guide rails 32, and acts to allow the receiving box 41 to slide smoothly within the guide part 31 after being inserted into the guide part 31.

At this time, the guide members 51 may be integral with the receiving box 41 at both sides thereof, respectively, and alternately, the guide members 51 may be inserted and fixed to seating grooves 42 formed at both sides of the guide part 31, respectively.

Each of the guide members 51 is provided at one side with supporting pieces 52, each of which has a curved shape to allow the supporting pieces 52 to come into intimate contact with a side surface of the guide part 31.

With such a construction as described above, the supporting piece 52 with the curved portion can constantly compress an associated side surface of the guide part 31, that is, the side surface of the guide part 31 where the guide recess 33 is formed, and thus can prevent clearance between the receiving box 41 and the guide part 31 from being created, whereby rattling and noise can be restricted upon sliding of the receiving box 41 along the guide part 31.

Here, it is effective to impart elasticity to each supporting piece 52 contacting the side surface of the guide part 31 by fabricating the supporting piece 52 of an elastic material.

Operation and advantageous effects of the present invention having the construction described above will now be described.

With the guide members 51 formed at both sides of the receiving box 41, the receiving box 41 is inserted into the guide part 31, such that each of the guide members 51 is placed between the upper and lower guide rails 32 formed on either inner side surface of the guide part 31.

At this time, although a clearance is typically created between each guide member 51 and the guide rails 32, each of the guide members 51 is provided at one side thereof with the rounded supporting pieces 52, which has the elasticity and is inserted into the guide recess 33 formed between the upper and lower guide rails 32, thereby minimizing the clearance between each guide member 51 and the guide rails 32.

That is, the round shape of each supporting piece 52 causes the supporting piece 52 to apply a constant over-tension to the guide part 31 by way of compressing the side surface of the guide part 31 in a state of being inserted into the guide recess 33, so that the rattling and noise can be minimized upon sliding of the receiving box 41 along the guide part 31.

As apparent from the above description, the guide structure of the tray in accordance with the present invention can constantly compress the guide recesses by means of the rounded supporting pieces on both sides of the receiving box, and reduce the clearance created between the receiving box and the guide part, thereby minimizing the rattling and noise generated upon sliding of the receiving box within the guide part.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A guide structure of a tray, comprising:
   a guide part equipped to a predetermined location within a vehicle and having a pair of upper and lower guide rails protruding on either inner side of the guide part while being spaced a predetermined distance apart from each other;
   a receiving box inserted into the guide part, the receiving box including at least one seating groove formed at each upper-rear corner of opposite sides thereof, the seating groove having an upper open end and an open side; and
   a plurality of guide members, each guide member configured to be secured to a respective seating groove and inserted between the upper and lower guide rails at either inner side surface of the guide part,
   wherein each of the guide members has supporting pieces provided on opposite ends of a curved elastic member which is secured to a side of the guide member, so as to allow the ends of the supporting pieces to contact the inner side surface of the guide part.

2. The guide structure according to claim 1, wherein each of the supporting pieces is made of an elastic material.

3. The guide structure according to claim 1, wherein each end of the supporting pieces has a round shape.

4. The guide structure according to claim 1, wherein each end of the supporting pieces has a square shape.

* * * * *